Aug. 29, 1967     L. P. CHRISTIANSEN     3,338,280
EGG OPENER
Filed Sept. 27, 1965     2 Sheets-Sheet 1
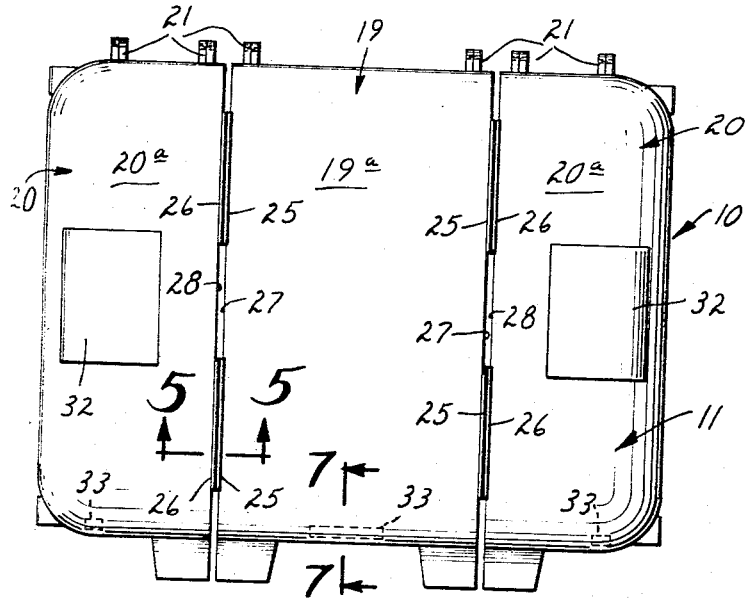
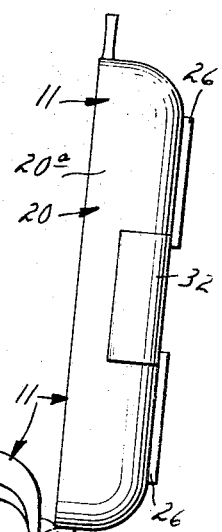
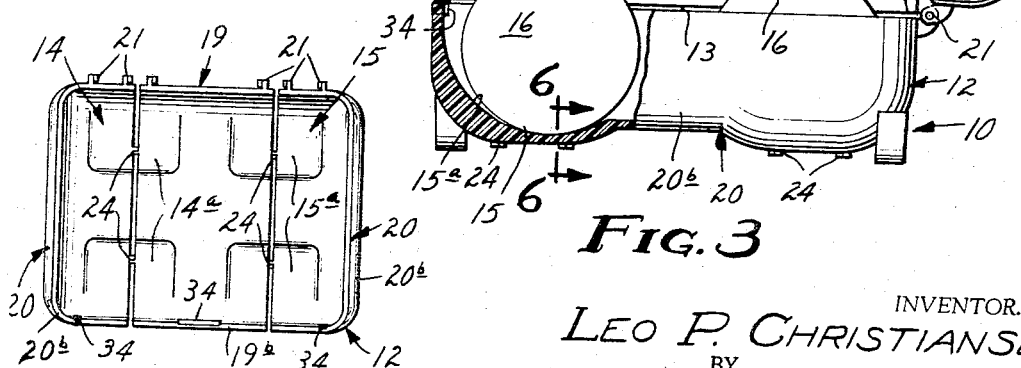
INVENTOR.
LEO P. CHRISTIANSEN
BY
Merchant, Merchant & Gould
ATTORNEYS Aug. 29, 1967  L. P. CHRISTIANSEN  3,338,280
EGG OPENER Filed Sept. 27, 1965  2 Sheets-Sheet 2

INVENTOR.
LEO P. CHRISTIANSEN
BY
Merchant, Merchant & Gould
ATTORNEYS

United States Patent Office 3,338,280
Patented Aug. 29, 1967

3,338,280
EGG OPENER
Leo P. Christiansen, 731 Mohican Court,
St. Paul, Minn. 55118
Filed Sept. 27, 1965, Ser. No. 490,534
6 Claims. (Cl. 146—2)

My invention relates generally to devices for opening of eggs, and more particularly, for simultaneously opening a plurality of eggs in a simple, sanitary, and efficient manner.

A further object of my invention is the provision of a device of the class above described wherein means is provided for simultaneous separation of a plurality of egg whites and yolks from their respective shells, and a subsequent emptying of same into a cooking container or the like without breaking the yolk or breaking the shell into fragments.

A further object of my invention is the provision of a device of the class above described which may be inexpensively produced from plastic materials or the like at a cost clearly justified by the benefits derived from the use thereof.

A further object of my invention is the provision of a device of the class above described which is extermely easy to load, unload, and operate.

A further object of my invention is the provision of a device of the class described which may be made in varying sizes, depending upon the requirements of the domestic or commercial user.

A further object of my invention is the provision of a device of the class described wherein provision is made for adjustment of the eggshell splitting mechanism whereby same may be used to accommodate eggs of different and varying dimensions.

The above and still further objects of my invention will become apparent from the following detailed specification, appended claims, and attached drawings.

Referring to the drawings wherein like characters indicate like parts throughout the several views:

FIG. 1 is a view in top plan of my novel device;

FIG. 2 is a view in front elevation, portions thereof broken away and shown in section;

FIG. 3 is a view in side elevation, portions thereof broken away and shown in section;

FIG. 8 is a view in horizontal section as seen from the line 8—8 of FIG. 2.

Figure 4:
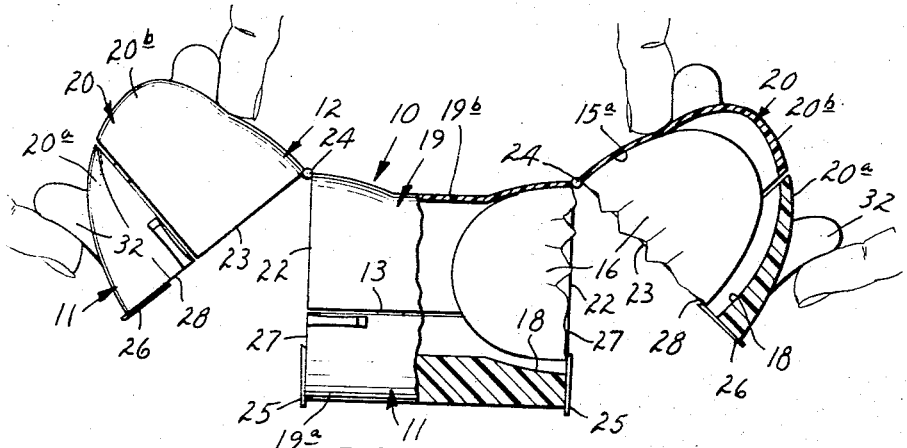
FIG. 4 is a view similar to FIG. 3 but in an inverted operative position.

Referring with greater particularity to the drawings, there is shown a shell-like housing 10 which is divided into upper and lower housing portions 11, 12, respectively, along a horizontal plane 13. Lower section 12 is formed to define laterally spaced, parallel rows 14, 15 of egg receiving recesses 14a, 15a, the longitudinal axes of which extend transversely of said rows. As seen particularly in FIGS. 2, 3, the recesses 14a, 15a are of a depth to receive a major portion of eggs 16 received therein with the remainder of eggs 16 being received in mating recesses 17, 18 formed in the upper housing member 11. It will be appreciated that, should housing portion 12 be made deeper, recesses 17, 18 would be unnecessary in housing section 11. In such an event, housing section 11 would be flat and serve merely to retain eggs 16 within their respective recess 14a, 15a.

For reasons which will hereinafter become apparent, housing 10 is further divided on laterally spaced, vertically disposed planes which are each substantially coincident with the transverse axis of one of the rows of recesses 14a, 15a, to provide central and laterally spaced side housing sections 19, 20. As shown, each of the sections 19, 20 include upper and lower elements 19a, 19b, and 20a, 20b, respectively, which are hingedly secured together along the rear side, as at 21, for common opening and closing movements thereof. The axis of hinges 21 are disposed along a line generally parallel to the longitudinal axes of the recesses 14a, 15a. Hingedly securing the abutting edges 22, 23 of lower elements 19b, 20b of housing sections 19, 20 together for opening and closing movements along the transverse axes of the recesses 14a, 15a are hinge elements 24.

With the above described hinge structure, the various sections 19a, 19b, 20a, and 20b of housing 10 are hingedly secured together to permit reception of eggs 16 in each of the rows of recesses 14a, 15a, when elements 19a, 20a are moved to the open position of FIG. 3, and maintained in such recesses upon closing of such elements as shown in FIG. 2.

Figure 5:
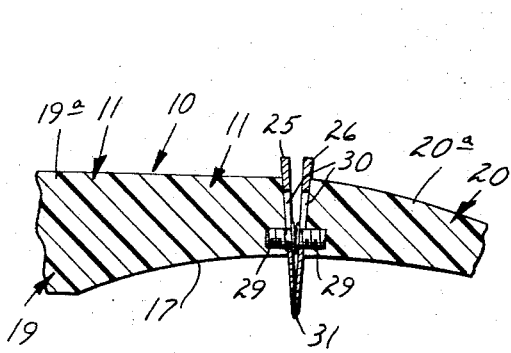
FIG. 5 is an enlarged sectional view as seen from the line 5—5 of FIG. 1.
Figure 6:
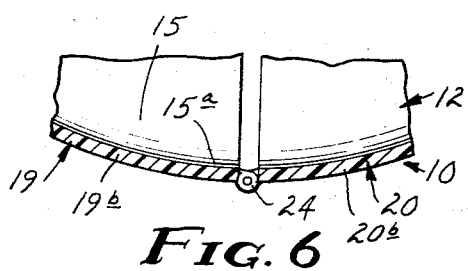
FIG. 6 is an enlarged sectional view as seen from the line 6—6 of FIG. 3.
Figure 7:
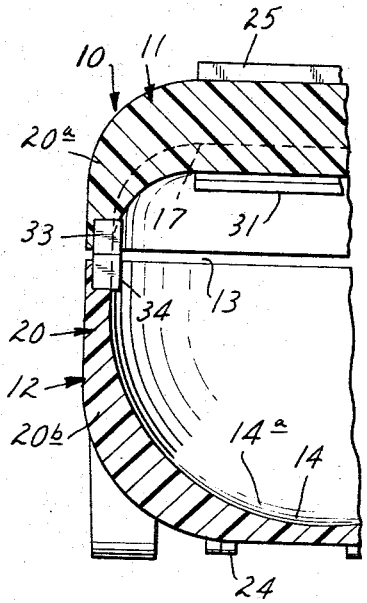
FIG. 7 is an enlarged sectional view as seen from the line 7—7 of FIG. 1.

For the purpose of splitting the shells of eggs 16 received within the rows of recesses 14a, 15a and subsequently depositing the contents thereof in a batter, skillet or other container, as will be presently explained, there is provided cooperating pairs of eggshell splitting knives 25, 26. Knives 25, 26 are one each secured to an opposed edge 27, 28, respectively of elements 19a, 20a of sections 19, 20 by means of screws 29. Screws 29 are each received through laterally spaced vertically elongated apertures 30, formed in each of the knives 25, 26 and have screw threaded engagement with their respective element 19a, 20a. Thus, each of the knives 25, 26 is mounted to permit adjustment thereof toward and away from an egg 16 positioned in its respective recess 14a, 15a, so as to assure splitting of eggs 16 of various dimensions when the elements 19a, 20a are moved to their closed position. It will also be noted, as particularly shown in FIG. 5, that each of the pairs of knives 25, 26 are mounted in such a manner as to converge downwardly to define a functionally unitary cutting edge 31. Thus, the shell of an egg 16 being split is split cleanly without undue fragmentation.

When it is desired to deposit the contents of a plurality of eggs 16, which have been initially split by the pairs of knives 25, 26 into a batter or other container, it is but necessary for an operator to grasp the side sections 20 of housing 10 and invert same to the position of FIG. 4. Thereafter, slight pressure is exerted to cause the sections 20 to pivot on the axis of the hinges 24. Such pivotal movements cause the knives 25, 26 to part and finally split all of the eggs 16, in the rows of recesses 14a, 15a, transversely of their longitudinal axes, into two halves. Thus, the contents thereof are permitted to drop therefrom, under the action of gravity, into the container in which they are to be deposited.

To facilitate grasping of the sections 20, the elements 20a, 20b, are provided with ears or handles 32. It will also be noted that such elements 19a, 19b, 20a, 20b, are releasably maintained in a closed position by means of the permanent magnets 33 imbedded in the front edges of the elements 19a, 20a, and magnetically attractable elements 34 imbedded in the elements 19b, 20b of sections 19, 20. Thus, accidental opening of such elements is prevented during operation.

My invention has been thoroughly tested and found to be completely satisfactory for the accomplishment of the above objects; and while I have disclosed a preferred embodiment thereof, same may well be capable of modi-

What is claimed is:
1. In a device of the class described:
 (a) a shell-like housing divided horizontally to provide upper and lower housing portions,
 (b) the lower of said portions defining a row of longitudinally elongated egg-receiving recesses, the longitudinal axes of which extend transversely of said row,
 (c) said housing being also divided vertically on a plane substantially coincident with the transverse axes of said recesses to provide pairs of upper and lower housing sections,
 (d) means hingedly securing said upper and lower housing sections together along one side for common opening and closing movements of the respective sections thereof along a line parallel to the longitudinal axes of said recesses,
 (e) second hinge means pivotally securing the abutting edges of the adjacent sections of said lower housing portion together for opening and closing movements along said transverse axis, and
 (f) cooperating eggshell splitting knife means carried by adjacent edges of said upper sections.

2. The structure defined in claim 1 in further combination with independent means for releasably securing together the unhinged edges of said upper and lower housing portions.

3. The structure defined in claim 1 in which said knife means includes a pair of opposed knife elements, one each carried by an opposed edge of one of said sections and converging downwardly to define a functionally unitary cutting edge when said housing portions are moved to their closed positions.

4. The structure defined in claim 3 in further combination with means for permitting adjustment of said knife elements towards and away from eggs in said recesses.

5. In a device of the class described:
 (a) a shell-like housing divided horizontally to provide upper and lower housing portions,
 (b) the lower of said portions defining laterally spaced parallel rows of longitudinally elongated egg-receiving recesses, the longitudinal axes of which extend transversely of said rows,
 (c) said housing being also divided on laterally spaced, vertically disposed planes which are substantially coincident with the transverse axis of their respective row of recesses to provide central and laterally spaced side housing sections,
 (d) means hingedly securing said upper and lower housing sections together along the rear side thereof for common opening and closing movements of the respective sections thereof along a line parallel to the longitudinal axis of said recesses,
 (e) second hinge means pivotally securing together the abutting edges of the adjacent sections of said lower housing portion for opening and closing movements along said transverse axes,
 (f) cooperating eggshell splitting knife means carried by the adjacent edges of said upper sections, and
 (g) independent means for releasably securing together the forward edges of the cooperating upper and lower sections of said housing.

6. The structure defined in claim 5 in which said last mentioned means comprises a permanent magnet carried by each of the sections of one of said housing portions and magnetically attractable elements carried by each of the sections of the other of said housing portions.

References Cited
UNITED STATES PATENTS

| | | | |
|---|---|---|---|
| 1,870,741 | 8/1932 | Nastrom | 146—2 |
| 2,706,507 | 4/1955 | Bartell | 146—2 |

WILLIAM W. DYER, Jr., *Primary Examiner.*

W. GRAYDON ABERCROMBIE, *Examiner.*